Dec. 10, 1963  B. G. WATTERS  3,113,634
SOUND-ABSORBING PANEL FOR LINING A DUCT
Filed July 11, 1958  3 Sheets-Sheet 1

INVENTOR.
BILL G. WATTERS
BY
Rines and Rines

INVENTOR.
BILL G. WATTERS
BY Rines and Rines

Dec. 10, 1963 B. G. WATTERS 3,113,634
SOUND-ABSORBING PANEL FOR LINING A DUCT
Filed July 11, 1958 3 Sheets-Sheet 3

INVENTOR.
BILL G. WATTERS
BY Rines and Rines

United States Patent Office 3,113,634
Patented Dec. 10, 1963

3,113,634
SOUND ABSORBING PANEL FOR LINING A DUCT
Bill G. Watters, Nahant, Mass., assignor to Bolt Beranek and Newman Inc., Cambridge, Mass., a corporation of Massachusetts
Filed July 11, 1958, Ser. No. 747,966
20 Claims. (Cl. 181—33)

The present invention relates to sound-absorbing panels and the like, and, more particularly, to sound-absorbing structures that are particularly adapted for lining ducts and similar passages for the purpose of absorbing and silencing the acoustic energy accompanying the flow of a fluid medium, such as air, through the ducts.

Very satisfactory sound-absorbing duct-linings and the like are disclosed in United States Letters Patent Nos. 2,759,554, 2,759,555 and 2,759,556, issued August 21, 1956, to Jordan J. Baruch. Such structures are adapted effectively to absorb a wide band of acoustic frequencies accompanying the flow of a fluid medium through a conduit or duct, with minimal length of acoustic-absorbing treatment, as discussed in the said Letters Patent. The acoustic-absorbing treatment may be scaled to fit in air-conditioning ducts, or, at the other extreme, in aircraft jet-engine test cells and the like. There are occasions, however, where it is desirable materially to reduce the cost of such acoustic-absorbing panels or duct-linings, and/or to reduce the pressure drop effected by the presence of such acoustic treatment in ducts and conduits.

An object of the present invention, accordingly, is to provide a new and improved sound-absorbing panel that not only markedly reduces the cost of such acoustic-absorbing structures, but, in addition, reduces the pressure-drop upon the fluid medium flowing through a conduit or duct and the like provided with such acoustic-absorbing treatment.

A further object is to provide a novel sound-absorbing panel construction that is adapted, also, for other types of acoustic panelling, lining or treatment of more general character.

Other and further objects will be explained hereinafter, and will be more particularly pointed out in the appended claims.

The invention will now be described in connection with the accompanying drawing, FIG. 1, of which is a perspective view illustrating the invention in preferred form, with parts broken away to illustrate constructional details;

Figure 1:
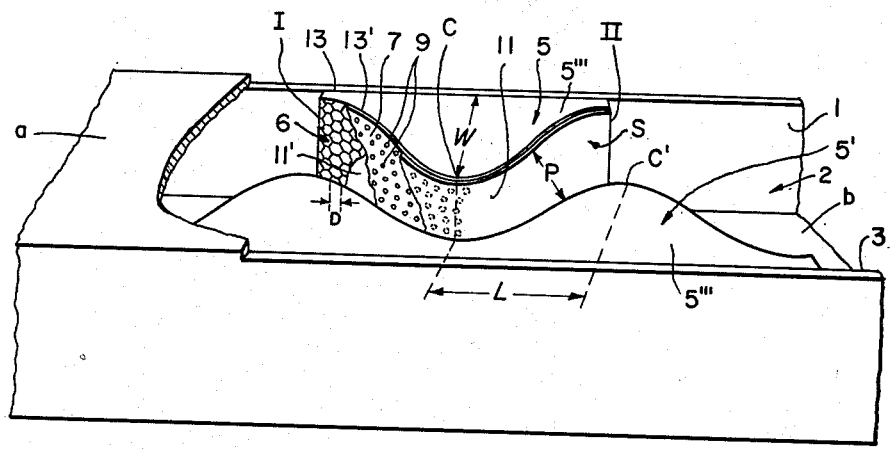
Figure 8:
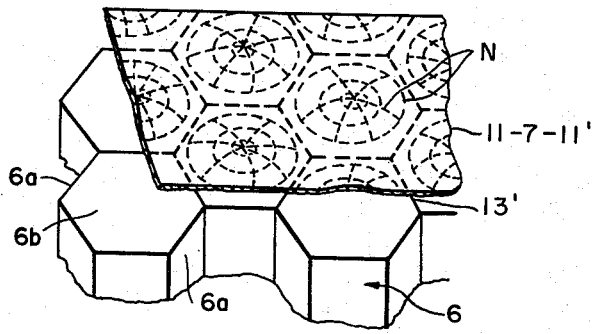
FIG. 8 is a fragmentary view, upon an enlarged scale, of another modified construction.

Referring to FIG. 1, a space, bounded at least in part, in which a fluid medium may flow and in which it is desired to absorb or silence acoustic energy accompanying the flow of the fluid medium, hereinafter referred to by the generic phrase "duct and the like," is shown at 2. The space 2 is, in this illustration, in the form of a conduit having side walls 1, 3, a top wall $a$ and a bottom wall $b$, the side walls 1 and 3 of which are lined along their inner surfaces with sound-absorbing panels 5 or 5', or preferably of substantially U-shaped construction, as described in the said Letters Patent. It is to be understood, however, that the term "U-shaped," as employed in the specification and claims, is intended to embrace, not only the smooth-curve configuration shown in the drawings, but also configurations that are of more of square-wave form, or that approach closer to triangular or V-shaped form. The representative U-shaped sound-absorbing panel 5, for example, comprises a preferably rigid cellular supporting structure, illustrated in the preferred form of a honeycomb supporting structure 6 secured at one end 13, as by cementing, to the inner surfaces of the walls 1 and 3 of the duct 2, and extending inward thereof. As shown in FIGURE 8 on enlarged scale, the cellular supporting structure 6 comprises a plurality of supporting members $6a$, the walls of the cells, which define spaces $6b$ therebetween, the openings of the cells. The cellular structure 6 may be constructed of substantially acoustically opaque metal or paper board, and the like, the cells being arranged in successively increasing and then decreasing height, to produce the illustrated substantially U-shaped envelope of the panel 5. The supporting members $6a$ at the left side I, for example, increase successively in height to a maximum at the crest C of the U-shaped member 5, and then decrease to the right II being covered by cover elements 5'''.

The inner or free end of the cellular structure 6 is preferably covered with a thin, non-self-supporting relatively flexible porous sheet S. In accordance with the preferred embodiment of the invention, this sheet comprises a perforated, relatively thin, preferably plastic layer carrier member 7, the perforations 9 of which constitute the pores of the sheet S, laminated with either or both of outer and inner extremely flexible porous acoustically-resistive materials, such as "tea-bag" paper, porous cellulose film, and the like, shown at 11 and 11', respectively, which render the sheet S acoustically-resistive. The thin, porous laminated sheet S is held in place at the inner end of the cellular supporting structure 6 by cementing or otherwise securing the same at 13' to the edges of the cell walls.

It is not, of course, new to propose to support an acoustically resistive member from a duct wall by supporting structures. In accordance with the present invention, however, the thin, flexible resistive sheet S is of the type that is not self-supporting, and that, to the contrary, is sufficiently limp that if supported in the manner that prior-art nettings and perforated metal sheets and the like have been supported, would be subject to several disadvantageous features. First, if the sheet S is enabled to flex over relatively large areas in response, particularly, to the low and lower intermediate acoustic frequencies of the band of sound energy accompanying the flow of the fluid medium through the duct 2, the material of the sheet will not present a lossy impedance having the necessary appreciable resistive component for effecting acoustic absorption, since the sheet itself moves at such relatively low acoustic frequencies. Secondly, while there would be some attenuation of certain acoustic frequencies related resonantly to the supporting-structure spacings used with the thicker prior-art metal-perforated facings and the like, at higher frequencies, the acoustic energy will tend to flow both within the sound-absorbing panel and outside the same, so that higher-frequency absorption does not occur and attenuation at the higher frequencies is lost. It is thus evident, that merely supporting the relatively flexible porous resistive sheet S contemplated in the use of the present invention in the manner that previous perforated sheet-material facings and the like have been supported, will not obtain the desired results of both low and high frequency attenuation, for these and other reasons. The problem underlying the present invention, therefore, is to support such non-self-supporting relatively flexible porous resistive sheets in a novel manner so as not only to prevent any large area flexing of such sheets in response to the lower-frequency acoustic energy (and, preferably also, in response to aerodynamic pressures or fluid-flow pressures acting upon the sheet), but, also, to prevent intermediate or high-frequency resonance occurring between the structures supporting the sheet, which, as above mentioned, while providing attenuation at the resonance frequency, destroys the possibility of attenuation in the necessary degree at higher frequencies.

These problems underlying the present invention have been completely overcome with a particular critical kind of dimensioning of the spaces between supporting members 6a. Specifically, it has been found that the cross-dimension of each cell 6b must have a certain dimensional relationship in order to obtain the required results. First, the cross-dimension D of each cell, namely, the dimension between the oppositely supporting walls thereof, must be relatively large compared with the dimension or dimensions of the pores, openings or perforations 9 in the layer 7 of the resistive sheet S in order that acoustic energy may pass through the sheet S into the space contained by the cells of the supporting structure 6. This space, may, if desired, itself be filled with sound-absorbing material, though the resistive sheet S has been found to be adequate without the necessity for other sound-absorbing material within the supporting structure 6. While the spacing D of the cell walls must, therefore, be rather large compared with that of the perforations or pores 9, it must, however, be sufficiently small to prevent resonance phenomena behind the sheet S, which, as before explained, would give rise to reduced high-frequency attenuation. It must also be sufficiently small to provide adequate mechanical support for the thin, relatively flexible sheet S in order to prevent that sheet from sagging and/or flexing, under the influence either of the low-frequency acoustic energy, or the aerodynamic or other fluid-flow pressures, and including, also, depending upon the orientation, the sagging effect that could be caused by gravity itself.

For the purposes of silencing the band of acoustic frequencies generally associated with air-conditioning, fan or other similar noises, including the silencing of speech frequencies that might be carried along air-conditioning ducts and the like, for example, a band of frequencies ranging from low frequencies in the neighborhood of 50 cycles per second, more or less, through the intermediate frequencies of the order of 300 cycles per second and above, and into the higher frequencies of the order of 2000 to 4000 cycles and the like, should all be absorbed with relatively high attenuation. In such a system, for example, the cross dimension P of the free fluid flow passage through the duct 2, extending normal to and between panels 5 and 5' may be of the order of seven inches, more or less. It has been found that the cross-dimension D of the cells 6b in such case should preferably be of the order of an inch; though, in some applications, supporting structures of dimension D in the range of from about one-quarter inch to about three inches may be employed, depending upon the results desired, but of dimension less than the cross dimension P of the passage through the duct. Stated otherwise, it has been found that the cross-dimension D, while greater than the cross-dimension of the perforations 9 in order to provide a number of perforations 9 for association with each cell 6b, should not be of so large a dimension as to be comparable with the dimension P; this, again, being consistent with providing adequate small-area support for the flexible sheet S in order to prevent its sagging and flexing, as before described.

In the system of FIG. 1, the longitudinal spacing L between the crest C of the member 5 and the crest C' of the opposite adjacent member 5' may be designed, and preferably is designed, in accordance with the criteria set forth in the said Letters Patent, to be of length substantially equal to some multiple of the half-wave length of the intermediate frequencies of the said band, thereby providing longitudinal resonance which assists in increasing intermediate-frequency attenuation. Similarly, as taught in the said Letters Patent, the maximum height W of the U-shaped members 5, 5' is preferably a quarter or some multiple of a quarter of the same intermediate-frequency wavelength, in order to produce additional intermediate-frequency attenuation, being thus also tuned to the said intermediate frequencies.

As an illustration, with the system of FIG. 1, four feet long and having a honeycomb cellular paper board supporting structure 6 of cell cross dimension $D=1$ inch, a total crest-to-crest spacing 2L of about two feet, a four-and-one-half inch duct passage width P, and a crest height W of about eight inches, the following results were obtained both with and without the use of the flexible resistive facing sheet S comprising a thin, polyvinyl layer 7 about ten mils thick, laminated with thin porous cellulose film 11, 11', and having one-sixteenth of an inch perforations 9 spaced about five thirty-seconds of an inch on centers:

| Frequency (Cycles) | Attenuation Without Resistive Facing, Sheet S' (Decibels) | Attenuation With Resistive Facing, Sheet S (Decibels) |
| --- | --- | --- |
| 50 | 3 | 8 |
| 200 | 3 | 10 |
| 1,250 | 32 | 41 |
| 2,500 | 41 | 47.5 |

Figure 3:
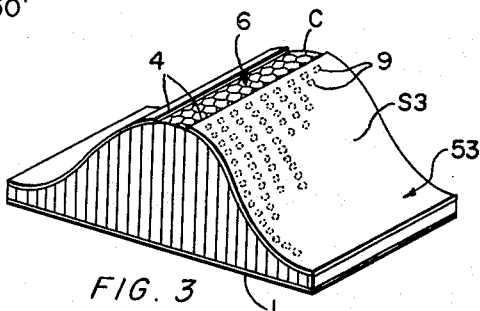
FIGS. 3 and 4 are views similar to FIG. 1, though enlarged and taken from a different angle, of modified panels, removed from the duct structure.
Figure 4:
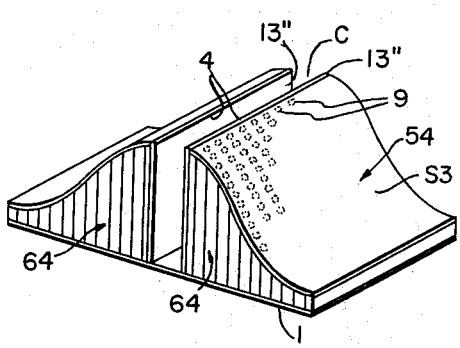

It will be observed that more than double the low-frequency attenuation and a marked increase in intermediate-frequency attenuation is obtained through the use of the system of FIG. 1; it being understood that, if desired, indeed, the curved cellular structure 6 itself may be used without the resistive facing where such additional low-frequency and intermediate-frequency attenuation is not desired.

Where it may be desired to introduce near the crest-region C of the U-shaped members 5, 5' a cavity type of resonance, in order to increase the attenuation in a particular band within the over-all band of frequencies accompanying the flow of the fluid medium through the duct 2, the perforated resistive member may be interrupted. FIGURE 3 illustrates a construction of this type, the panel 53 corresponding, for example, to the panel 5 of FIGURE 1 and comprising the same cellular supporting structure 6 and a resistive facing sheet S3 made up of the perforated layer 7 and resistive films 11 and 11' previously described, but with the facing sheet interrupted at 4 adjacent the crest C of the supporting structure. Similar results may be obtained by interrupting the supporting structure 6 of FIG. 3 in the region 4 and substituting acoustically opaque baffles. FIGURE 4 illustrates this construction, in which the panel 54, corresponding to the panel 53 of FIGURE 3, has its cellular supporting structural 64 interrupted in the region 4, acoustically opaque baffles 13" bounding the exposed regions of the supporting structure 64 on opposite sides of the crest C of the supporting structure.

Figure 7:
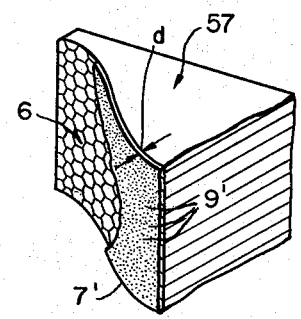
FIG. 7 is a fragmentary perspective view, similar to FIGS. 1 and 3, of still an additional modified structure.

Other types of acoustically lossy sheets, having appreciable resistive components, may also be used with the supporting structures of the present invention including, for example, the type of perforated thin sheet material described in copending application, Serial No. 534,958 of the present applicant and the said Jordan J. Baruch, filed September 19, 1955, for "Acoustic Absorber," now United States Patent No. 2,935,151, issued May 3, 1960. FIGURE 7 illustrates the use of such sheet material 7' in a panel 57 having a supporting structure 6 of the type previously described. As explained in said Patent No. 2,935,151, there must be a particular critical relationship between the thickness $d$ of the perforated facing sheet 7' expressed in thousandths of an inch, the number $n$ of perforations or pores 9' per square inch of the sheet 7', and the half-cross-dimension $r$ of the perforations such as the radius in the case of a circular perforation, 9', or pores also expressed in thousandths of an inch, as follows:

$$4 \log_{10} r = K - \log_{10} n/d$$

where $K$ is a constant lying substantially within the range of from substantially 2.39 to substantially 4.39, and where the cross-dimension $2r$ of the perforations 9' preferably lies within the range of from substantially 2 to substantially 40 thousandths of an inch. Similarly, other types of flexible non-self-supporting limp resistive facings of a porous nature may be employed.

Figure 2:
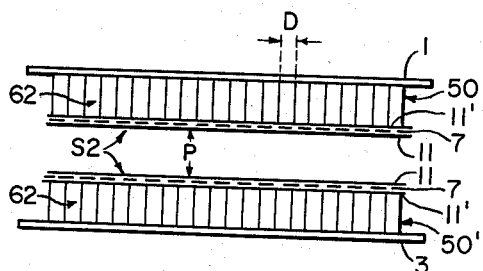
FIG. 2 is a top view, upon a somewhat smaller scale, of a modified panel embodying the construction of the present invention, with covers removed to expose the cellular structure thereof.
Figure 5:
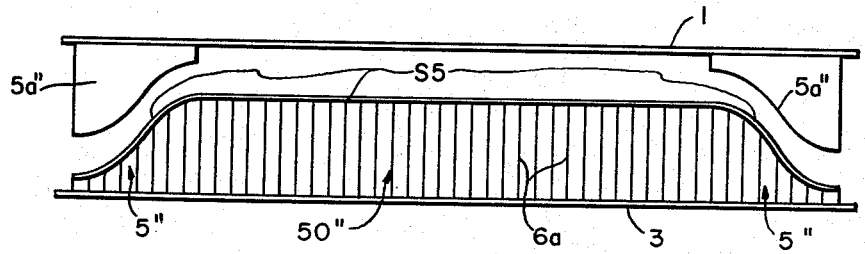
FIGS. 5 and 6 are views similar to FIG. 2 of still further modified structures.

It is not essential, moreover, that the relatively inexpensive construction of the present invention be applied solely to the type of preferred U-shaped panels discussed in connection with FIGS. 1, 3, 4 and 7. To the contrary, other types of sound-absorbing panel configurations may also be employed. Referring to FIG. 2, for example, substantially planar rectangular or straight panels 50, 50' are illustrated embodying cellular supporting structures 62 having cells of uniform height and flat parallel flexible resistive facing sheets S2 composed of layers 7 and films 11, 11', again having the same critical relationships of dimensions, before referred to. Similarly, the thin perforated facing 7' of FIG. 7 could be used as the sound-absorbing facings, in place of those shown, in the configuration of FIG. 2 and in the embodiments of all of the other figures as well. A combination of the curved structures of FIGS. 1, 3, 4 and 7, and the straight structure of FIG. 2 may also be employed, as another example. Thus, in FIG. 5, there is shown a substantially rectangular panel section 50'' of uniform-height supporting members 6a having curved ends 5'' corresponding to portions of the U-shaped panel structures of FIGS. 1, 3, 5 and 7, and providing an overall elongated U-shaped panel 5''—50''—5''. The supporting members 6a may be constructed as before, being provided at their inner ends with a resistive sheet S5, which may be formed from the perforated layer 7 and resistive films 11, 11' previously described. As shown, the straight panel portion 50'' may oppose an unlined portion of the duct wall 1, between additional curved panel portions 5a'' attached to wall 1 in opposition to the curved panel portions 5''.

If it is desired to introduce particular frequency resonance phenomena, of course, the acoustically opaque supporting members 6b may, in some areas, be rendered substantially transparent. Thus in FIGURE 6 a panel structure 56 has a cellular supporting structure 66 in which the supporting members 6' at the region A are rendered acoustically transparent by perforating them. A resistive facing sheet S6 of the type previously described is attached to the inner end of the supporting structure. Similar treatment may, of course, be effected in the U-shaped and other panel configurations, as well. Resonance will then occur behind the resistive sheet of the type selected between the acoustically opaque supporting members 6 bounding the area A within which the substantially acoustically transparent or perforated supporting members 6' are provided.

If further attenuation at certain frequencies is desired, the relatively small portions of the resistive facing sheet that are attached at 13' to the end of each supporting member 6b may, if desired, be caused to vibrate or resonate, thus to introduce further attenuation phenomena at those frequencies, as more particularly shown by the dotted nodal vibration lines N in FIG. 8.

The remarkable results attained with the absorbing or muffling panels of the present invention, and the importance of the critical dimensions of the supporting structure, before discussed, may be further illustrated by the following experimental results. If, for example, the resistive facing sheet is supported by four-inch high supporting members 6a in the parallel structure of FIGS. 2 and 6, spaced one-foot apart and thus of greater dimension D than the fluid passage cross dimension P of about seven inches, a resonant peak at about 250 cycles is produced as a result of the one-foot supporting member spacing. Below 250 cycles, the flexible resistive facing sheet tends to flex over the relatively large one-foot portions, so that at 50 cycles, there is zero measurable attenuation, and at 100 cycles, there is only about three decibels of attenuation. At the higher frequencies, above the resonant 250-cycle frequency, the acoustic energy travels behind the resistive facing sheet as well as in front, so that, as before described, poor high-frequency attenuation is obtained. Thus, at the higher intermediate frequency of 800 cycles, only four decibels of attenuation is produced; at 1250 cycles, only three decibels; and at 2500 cycles, only five decibels.

Where, however, the spaces between the supporting members are made sufficiently small to prevent such large-area flexing, as when four-inch high cells 6b of cross dimension D are employed in the duct of FIG. 2 having an approximately three-inch fluid passage cross-dimension P, no such 250-cycle or other resonant peak occurs. Greater intermediate and higher frequency attenuation also results. Thus, at 800 cycles, twenty decibels of attenuation is obtained; at 1250 cycles, 16 decibels; and at 2500 cycles, 12 decibels.

Figure 6:
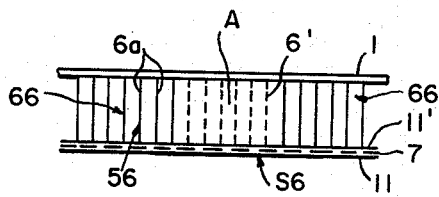

If one wished to convert the above-described intermediate-frequency absorber or muffler into, for example, a lower-frequency muffler, one might perforate certain of the supporting members 6', as in FIG. 6, in order to obtain low-frequency resonances, while still supporting the flexible resistive facing sheet against flexing so as not to destroy the very low-frequency and high-frequency attenuation.

Figure 9:
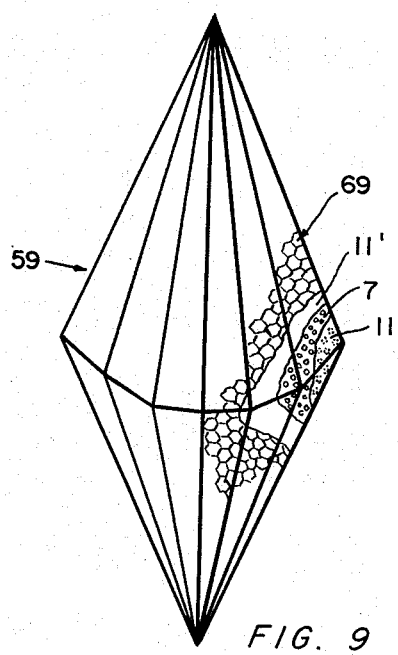
FIGS. 9 and 10 are perspective views of further modifications.
Figure 10:
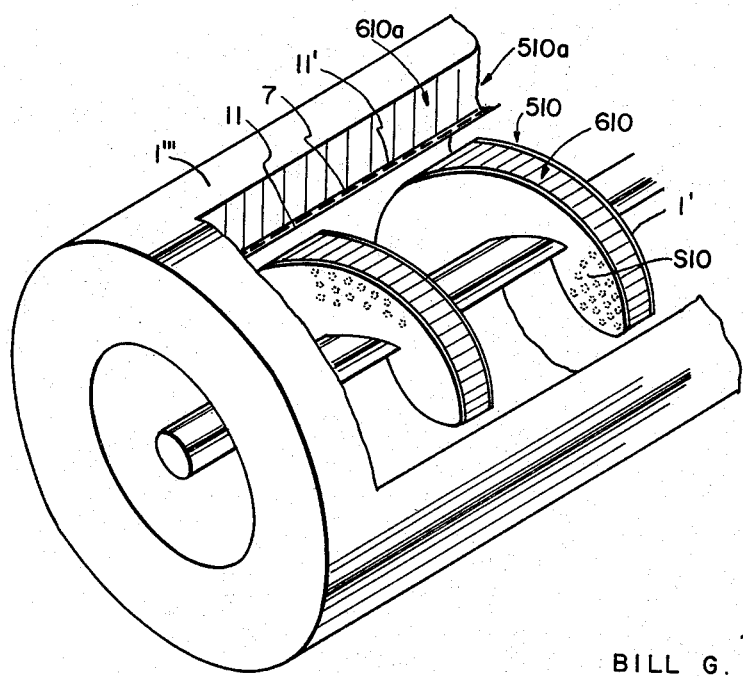

The structures of the invention may also be formed into other configurations or forms, such as, for example, the particular surface of revolution 59 of FIG. 9, having a cellular supporting structure 69 with a resistive facing sheet comprising the perforated layer 7 and resistive films 11, 11' previously described. Another modification is shown in FIGURE 10, in which a muffler is constituted by a circular or oval duct 1''' having therein a helical wall 1' lined with a helical panel 510 of the invention, having a cellular supporting srtucture 610 with a resistive facing sheet S10 of the types previously described. The inner walls of the duct are preferably also lined with a sound absorbing structure 510a, comprising the cellular supporting structure 610a and a resistive facing sheet which may include the perforated layer 7 and the resistive films 11, 11' previously described. To assist in fabricating such forms, the honeycomb-like or other supporting structures are preferably relatively flexible laterally.

Further modifications will also occur to those skilled in the art, and all such are considered to fall within the spirit and scope of the invention, as defined in the appended claims.

What is claimed is:

1. A sound-absorbing panel for lining a portion only of a duct and the like having, in combination with the duct, a thin limp relatively flexible porous sheet having an impedance to acoustic energy that is appreciably resistive, a plurality of relatively rigid supporting members defining spaces therebetween and secured at one end to a surface of the duct and at the other end to the sheet, said duct having a fluid passage therethrough adjacent said sheet with a cross-dimension normal to said sheet, the spaces of the supporting members being large compared to the pores of the sheet but small compared to the said cross dimension, the said spaces being also sufficiently small to provide support for the relatively flexible sheet in order substantially to prevent its sagging and flexing.

2. The panel of claim 1, said supporting members having substantially equal height.

3. The panel of claim 1, said sheet being substantially

U-shaped and said supporting members having successively increasing and then successively decreasing height, whereby said panel is substantially U-shaped.

4. A sound-absorbing panel as claimed in claim 3 and in which the supporting members in the region of the crest of the U-shape thereof are of substantially uniform height to provide a substantially flat neck region.

5. A sound-absorbing panel as claimed in claim 3 and in which the sheet is interrupted in the region of the crest of the U-shape thereof to expose the panel to acoustic energy directly and not through the resistive sheet.

6. A sound-absorbing panel as claimed in claim 3 and in which the exposed crest region of the U-shape thereof is bounded by acoustically opaque baffles.

7. A sound-absorbing panel as claimed in claim 3 and in which the maximum height of the U-shaped panel is tuned to the intermediate frequencies of the band of sound frequencies to be transmitted along the duct.

8. The panel of claim 1, said sheet comprising a thin carrier member having the pores of said sheet laminated with at least one flexible acoustically resistive layer which renders said sheet acoustically resistive.

9. The panel of claim 1, said sheet comprising a thin member of thickness $d$, expressed in thousandths of an inch, having a number $n$ of pores per square inch and a pore half-cross-dimension $r$, expressed in thousandths of an inch, related substantially by the expression $$4 \log_{10} r = K - \log_{10} n/d$$

where K is a constant lying within the range of from substantially 2.39 to substantially 4.39.

10. A sound-absorbing panel as claimed in claim 9 and in which the cross dimension of the said pores lies within the range of from substantially 2 to substantially 40 thousandths of an inch.

11. The panel of claim 1, said supporting members being substantially acoustically opaque.

12. The panel of claim 1, said supporting members being substantially acoustically transparent.

13. The panel of claim 1, some of said supporting members being substantially acoustically opaque and some substantially acoustically transparent.

14. The panel of claim 1, said sheet being secured to said supporting members to permit resonant vibration of the sheet portions between successive supporting members.

15. The panel of claim 1, said supporting members and the spaces therebetween being shaped to define a cellular supporting structure.

16. The panel of claim 1, the portions of said sheet between successive supporting members having a plurality of said pores and said panel having a cover extending between said sheet and said duct surface.

17. A sound-absorbing structure having, in combination, a duct, and a plurality of sound-absorbing panels spaced apart to define a fluid passage therebetween with a cross-dimension between said panels, each of said panels comprising a thin limp relatively flexible porous sheet having an impedance to acoustic energy that is appreciably resistive, a plurality of relatively rigid supporting members defining spaces therebetween and secured at one end to a corresponding surface of the duct and at the other end to the sheet, the spaces of the supporting members being large compared to the pores of the sheet but small compared to said duct passage cross-dimension, said spaces being also sufficiently small to provide support for the relatively flexible sheet in order substantially to prevent its sagging and flexing.

18. The structure of claim 17, said panels having successive U-shaped portions with the crests and troughs of one panel alternating with the crests and troughs of the other panel, the longitudinal spacing between the crests of one panel and the adjacent crests of the other panel being a multiple of the half wavelength of the intermediate frequencies of the band of sound frequencies to be transmitted along the duct.

19. The structure of claim 18, the maximum height of the panels being tuned to said intermediate sound frequencies.

20. The structure of claim 17, said panels being substantially parallel.

References Cited in the file of this patent

UNITED STATES PATENTS

| | | |
|---|---|---|
| 2,159,488 | Parkinson | May 23, 1939 |
| 2,419,971 | Rumpf et al. | May 6, 1947 |
| 2,502,016 | Olson | Mar. 28, 1950 |
| 2,595,047 | Beranek | Apr. 29, 1952 |
| 2,759,554 | Baruch | Aug. 21, 1956 |
| 2,759,555 | Baruch | Aug. 21, 1956 |
| 2,759,556 | Baruch | Aug. 21, 1956 |
| 2,838,806 | Sabine | June 17, 1958 |
| 2,870,857 | Goldstein | Jan. 27, 1959 |
| 2,916,101 | Naman | Dec. 8, 1959 |

FOREIGN PATENTS

| | | |
|---|---|---|
| 774,333 | France | Sept. 17, 1934 |
| 822,307 | France | Sept. 13, 1937 |
| 664,729 | Great Britain | Jan. 9, 1952 |
| 58,611 | France | Oct. 21, 1953 |
| 746,949 | Great Britain | Mar. 21, 1956 |
| 206,535 | Australia | Apr. 18, 1956 |
| 547,266 | Canada | Oct. 8, 1957 |